UNITED STATES PATENT OFFICE.

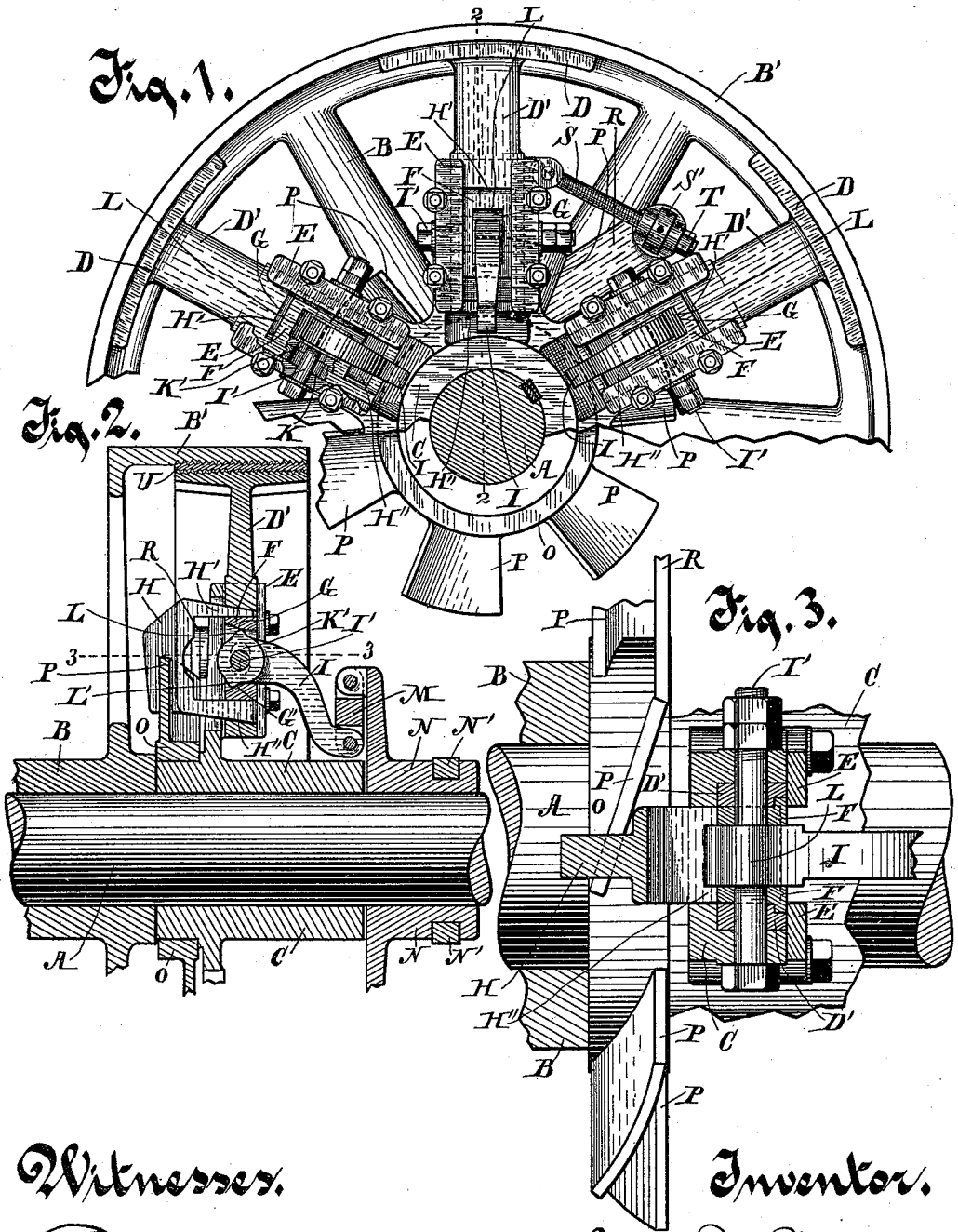

JOHN D. EHRMANN, OF KAUKAUNA, WISCONSIN, ASSIGNOR TO THE ATLAS IRON AND BRASS WORKS, OF SAME PLACE.

FRICTION-CLUTCH.

SPECIFICATION forming part of Letters Patent No. 438,614, dated October 21, 1890.

Application filed February 8, 1890. Serial No. 339,708. (No model.)

*To all whom it may concern:*

Be it known that I, JOHN D. EHRMANN, of Kaukauna, in the county of Outagamie, and State of Wisconsin, have invented new and useful Improvements in Friction - Clutches; and I do hereby declare the following to be a full, clear, and exact description of said invention, reference being had to the accompanying drawings, and to the letters of reference marked thereon, which form a part of this specification.

My invention relates to that form of clutch which is adapted for the purpose of starting and stopping lines of shafting and machines or any part of machines.

In the drawings, Figure 1 is an end view of a portion of the clutch, the shifting hub or sleeve being omitted to show other parts more perfectly. Fig. 2 is a longitudinal section of so much of the device as is shown in Fig. 1 on line 2 2 thereof. Fig. 3 is a section and plan of a portion of that part of the device shown in Fig. 2 on line 3 3 thereof.

A is a shaft on which is supported a loose pulley or disk B, provided with a laterally-projecting rim B'. Spider C is keyed fast to shaft A. Segmental bearings D D, each provided with an inwardly-extending arm D', are adapted on their outer surfaces to engage the inner surface of the rim B'. Each of the arms D' is constructed and arranged to slide radially in ways therefor in a spoke of the spider C, a properly-formed channel in the spoke being provided therefor and the arm being retained therein conveniently by plates or guards E E, secured removably to the spokes of the spider C. The arms D' D' are each provided near their inner ends with a longitudinal slot in which is placed a loose block F, which block is also provided with a slot having reversely-inclined walls G G', the inclination of these walls extending from one surface of the block partly across the block, the remaining portion of the walls of the slot at the same ends being at right angles to the face of the block.

The block F sits between the two wedge-shaped arms H' and H'' of the yoke H, and the yoke H is made to slide in the slot of arm D', the end walls of the slot in the arm D' being beveled to the same inclination as the wedge-shaped arms H' and H'' of the yoke H.

The wedge H' is thinnest at its free end and the wedge H'' thickest at its free end, respectively, the opposing walls in slot of arm D' being correspondingly beveled.

To compensate for the wear and regulate the friction of the segment-arms D D on the rim B', the segment-arms D D are made radially adjustable by means of the yoke H, which being forced in or out will cause the arm D to change its position radially, as required. The block F and yoke H form an adjusting device in the arm D', being adjustable therein for the purpose of adjusting the arm radially, and being otherwise a part of the arm movable radially therewith.

The levers I I, the inner end of each of which is located in the slot in the block F, is pivoted on a bolt I', which bolt is fixed in the side walls of the recess in a spoke of the spider. The bolt I' passes through elongated slots K K' in the side walls of the arm D' and the block F, which slots are provided to permit the radial movement of the block F and arm D.

The lever I is provided with outer and inner arms or eccentrics L L', which bear against the walls G and G', respectively, of the slot in block F. The long arm of the lever I is pivoted to the inner end of a link M, and the outer end of the link is pivoted to a shifting hub N. The hub N has movement longitudinally on the shaft A and rotary movement therewith, being splined thereon. A loose collar N' rides in a groove therefor in the hub N, and is provided as a means for attaching a shifting-lever to the hub.

The construction and relative arrangement of the parts to each other are such that when the hub N is moved on the shaft A up to the hub of spider C the link M will be in the position shown in Fig. 2, at right angles to the axis of the shaft, whereby the lever I is locked and the eccentric on lever I pressing outward on arm D', thereby locking both pulley B and spider C together, and the machine or line of shafting is thereby set in motion. It will be understood that when the hub N is shifted along the shaft A away from the spider C the long arm of the lever I will be thrown outwardly away from the shaft, whereby the eccentric L' will be moved along the wall G' of the block F until it rests against the straight or right-angled part of that wall, whereby the arm D' will be locked in position against movement outwardly radially by the revolving of the shaft A.

For the purpose of adjusting the yokes H in or out between the blocks F and the walls of the arms D' and locking them in position a sleeve O, having screw-blades P P, is provided, which sleeve is revoluble limitedly on the hub of the spider C. Each of these blades P enters a recess therefor in a yoke H, and by the limited revolution of the sleeve O the yokes H are adjusted in or out, as desired. The sleeve O is so arranged that it has no endwise movement with reference to the hub of the spider C, so that by its rotary movement the adjustment of the yoke by means of the screw-blades is accomplished. For rotating the sleeve O it is provided with an arm R, and a screw-bolt S is hinged at one end to one of the spokes of the spider C and at the other end it passes through bearings therefor in the arm R, and is provided with a nut S' between the bearings on the arm, and also with a jam-nut T for locking it in position. By turning the nut S' the sleeve O can be rotated to right or left, whereby the yoke H is forced in or out and the block F adjusted and locked in position, as desired.

A serrated Babbitt or soft metal shoe U is preferably affixed to the surface of the segmental bearing D to provide a more perfect adjustment and more secure engagement with the rim B'.

What I claim as new, and desire to secure by Letters Patent, is—

1. In a clutch, the combination, with a spider fixed on a shaft, of a segmental bearing-arm movable radially on a spoke of the spider, and a swinging lever pivoted on the spoke of the spider and provided with eccentrics bearing inwardly and outwardly against inclined walls in the arm of the segment, whereby by the tilting of the lever the segmental bearing is moved radially, substantially as described.

2. In a clutch, the combination, with a spider fixed on a revolving shaft, of a segmental bearing-arm having radial movement on a spoke of the spider, a block inserted in the arm of the segmental bearing adapted for adjusting the segmental bearing radially, which block is provided with a slot having reversely-inclined walls and a lever pivoted on the spoke of the spider and provided with outer and inner eccentrics bearing against the reversely-inclined walls of the slot in the blocks, substantially as described.

3. In a clutch, the combination, with a spider fixed on a revolving shaft and a thereon radially-moving segmental bearing-arm, of a block inserted in the segmental bearing-arm, which block has a slot having end walls partially reversely inclined and partially straight, and a swinging lever pivoted on the spoke of the spider and provided with eccentrics adapted to bear against the inclined portions of the walls of the slot of the block and to engage with the straight or right-angled portions of the walls of the slot in the block, substantially as described.

4. In a clutch having a radially-moving arm, the combination, with a block inserted in a slot therein and on which the arm is adjustable, which block is adapted to receive the outward and inward thrust of a swinging lever, of a yoke having reversely wedge-shaped arms inserted between the ends of the block and correspondingly beveled walls of the slot in the radially-moving arm, substantially as described.

5. In a clutch, the combination, with a radially-moving arm and a block on which the arm is adjustably inserted in a slot therein, of a yoke having reversely wedge-shaped arms entering the slot in the radially-moving arms at the ends of the movable block and a rotating sleeve having screw-blades which enter recesses therefor in the yokes, substantially as described.

6. In a clutch, the combination, with yokes having reversely wedge-shaped arms adapted for adjusting radially-moving arms on blocks inserted in slots therein, of a rotating sleeve provided with screw-blades engaging the yokes and an adjusting screw-threaded bolt attached at one end to a fixed part of the clutch and at the other end connecting adjustably with an arm of the rotating sleeve, substantially as described.

7. In a clutch, the combination, with a spider fixed on a revolving shaft and a segmental bearing-arm having radial movement on the spider, of a lever provided with eccentrics having outer and inner bearings against inclined walls of a slot located in the bearing-arm, and a shifting hub movable endwise on the shaft and connected movably to the outer end of the lever by a link, the outer end of which is pivoted to the hub and the inner end of which is pivoted to the swinging lever, substantially as described.

In testimony whereof I affix my signature in presence of two witnesses.

JOHN D. EHRMANN.

Witnesses:
G. H. DAWSON,
LEONARD B. SAGE.